(12) United States Patent
Ryu et al.

(10) Patent No.: US 10,505,167 B2
(45) Date of Patent: Dec. 10, 2019

(54) SEPARATOR FOR ELECTROCHEMICAL DEVICE

(71) Applicant: LG CHEM, LTD., Seoul (KR)

(72) Inventors: Bi-Oh Ryu, Daejeon (KR); Kyung-Hwan Yoon, Daejeon (KR); Heon-Sik Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 305 days.

(21) Appl. No.: 14/914,494

(22) PCT Filed: Nov. 6, 2014

(86) PCT No.: PCT/KR2014/010632
§ 371 (c)(1),
(2) Date: Feb. 25, 2016

(87) PCT Pub. No.: WO2015/069045
PCT Pub. Date: May 14, 2015

(65) Prior Publication Data
US 2016/0204406 A1 Jul. 14, 2016

(30) Foreign Application Priority Data

Nov. 6, 2013 (KR) .................. 10-2013-0134302
Dec. 6, 2013 (KR) .................. 10-2013-0151551
(Continued)

(51) Int. Cl.
H01M 2/14 (2006.01)
H01M 2/16 (2006.01)
H01M 10/052 (2010.01)

(52) U.S. Cl.
CPC .......... H01M 2/145 (2013.01); H01M 2/162 (2013.01); H01M 2/1646 (2013.01);
(Continued)

(58) Field of Classification Search
CPC .. H01M 2/145; H01M 2/1646; H01M 2/1686; H01M 2/162; H01M 2/1653; H01M 10/052
See application file for complete search history.

(56) References Cited

U.S. PATENT DOCUMENTS 3,322,553 A   5/1967   Seifried et al.
5,817,425 A   10/1998  Morishige et al.
(Continued)

FOREIGN PATENT DOCUMENTS

EP   2 999 028 A1   3/2016
EP   3 024 061 A1   5/2016
(Continued)

OTHER PUBLICATIONS

International Search Report (PCT/ISA/210) issued in PCT/KR2014/010632, dated Feb. 26, 2015.

*Primary Examiner* — Eugenia Wang
(74) *Attorney, Agent, or Firm* — Birch, Stewart, Kolasch & Birch, LLP

(57) ABSTRACT

The present disclosure provides a separator for an electrochemical device, comprising: a porous polymer film; and a porous coating layer formed on one or both surfaces of the porous polymer film and comprising at least one of inorganic particles and organic particles, and a binder polymer, wherein fibrils in the surface of the porous polymer film are entangled with the particles in the porous coating layer in the contact surface between the porous polymer film and the porous coating layer, and the separator has an air permeability of 100 to 800 sec/100 cc, an electrical resistance of 0.5 to 1.5Ω, and a heat-shrinkage rate of 8% or less in each of machine and transverse directions, and an electrochemical device having the same.

21 Claims, 12 Drawing Sheets
(7 of 12 Drawing Sheet(s) Filed in Color)

(30) Foreign Application Priority Data

Dec. 9, 2013 (KR) .................. 10-2013-0152454
Nov. 6, 2014 (KR) .................. 10-2014-0153753

(52) U.S. Cl.
CPC ........ *H01M 2/1686* (2013.01); *H01M 2/1653* (2013.01); *H01M 10/052* (2013.01)

(56) References Cited

U.S. PATENT DOCUMENTS

| | | | |
|---|---|---|---|
| 2002/0192454 A1* | 12/2002 | Takata | B01D 67/0027 428/315.5 |
| 2006/0103055 A1 | 5/2006 | Hoshuyama et al. | |
| 2008/0292968 A1* | 11/2008 | Lee | H01M 2/14 429/247 |
| 2009/0111026 A1 | 4/2009 | Kim et al. | |
| 2010/0252426 A1* | 10/2010 | Tsukuda | H01G 9/02 204/296 |
| 2011/0259505 A1 | 10/2011 | Lee et al. | |
| 2012/0028103 A1* | 2/2012 | Weber | H01M 2/162 429/145 |
| 2013/0101886 A1 | 4/2013 | Jung et al. | |
| 2013/0171499 A1* | 7/2013 | Yang | H01M 2/162 429/145 |
| 2014/0335396 A1* | 11/2014 | Onizawa | H01M 2/1653 429/145 |
| 2015/0004467 A1 | 1/2015 | Kim et al. | |

FOREIGN PATENT DOCUMENTS

| | | |
|---|---|---|
| JP | 9-76437 A | 3/1997 |
| JP | 2007-182464 A | 7/2007 |
| JP | 2009-019118 A | 1/2009 |
| JP | 2010-517811 A | 5/2010 |
| JP | 2011-162773 A | 8/2011 |
| JP | 2013-89593 A | 5/2013 |
| KR | 10-0877161 B1 | 1/2009 |
| KR | 10-2011-0035847 A | 4/2011 |
| KR | 10-2013-0091459 A | 8/2013 |
| WO | WO 99/48959 A1 | 9/1999 |
| WO | WO 2010/134501 A1 | 11/2010 |
| WO | WO 2012/137847 A1 | 10/2012 |
| WO | WO-2013047600 A1 * | 4/2013 .......... H01M 2/1653 |

* cited by examiner

SEPARATOR FOR ELECTROCHEMICAL DEVICE

TECHNICAL FIELD

The present disclosure relates to a separator for an electrochemical device, more specifically a separator for an electrochemical device which has improved mechanical and thermal properties.

This application claims priority to Korean Patent Application No. 10-2013-0134302 filed in the Republic of Korea on Nov. 6, 2013, which is incorporated herein by reference.

Also, this application claims priority to Korean Patent Application No. 10-2013-0151551 filed in the Republic of Korea on Dec. 6, 2013, which is incorporated herein by reference.

In addition, this application claims priority to Korean Patent Application No. 10-2013-0152454 filed in the Republic of Korea on Dec. 9, 2013, which is incorporated herein by reference.

Further, this application claims priority to Korean Patent Application No. 10-2014-0153753 filed in the Republic of Korea on Nov. 6, 2014, which is incorporated herein by reference.

BACKGROUND ART

Recently, there has been an increasing demand of electrochemical devices with high-capacity and high-output in the field of small, medium and large electrochemical devices. The high-capacity and high-output electrochemical devices generally have a separator in the form of a thin film, and such a separator is required to have low electrical resistance and maintain safety.

In the case of the high-capacity and high-output electrochemical device, the thickness of a separator decreases as loading amounts of electrodes increase within limited spaces, and this electrochemical device needs a separator having high porosity for its high output. However, the high porous separator has very poor mechanical and thermal properties. Particularly, the separator fails to suppress thermal propagation during safety tests (impact, nail penetration, hot box and so on), thereby causing ignition and explosion on heating. For this reason, in spite of electrochemical devices having good performances, the electrochemical devices often fail to get certification and are not used.

In the separator, three types of substrates according to preparation methods may be used. One of the preparation methods is to make polyolefins into thin fiber to obtain a porous substrate in the form of a non-woven fabric. Another is a drying method that stretches a thick polyolefin film at a low temperature to cause micro cracks between lamella being crystalline structure of the polyolefin film, thereby forming micropores. The other is a wetting method that mixes polyolefins with diluents to form a single phase, brings the polyolefins and the diluents into phase-separation during cooling, and extracts the part of the diluents to form pores in the polyolefins.

The separator consisting of only such a substrate has poor thermal/mechanical properties. In order to enhance safety, the porous substrate has been provided with a heat-resistant coating of organic particles/inorganic particles thereon to prepare a composite separator, but there is a still need of improvement.

DISCLOSURE

Technical Problem

The present disclosure is designed to solve the above-mentioned problems, and therefore the present disclosure is directed to a separator for an electrochemical device being a composite separator comprising a porous coating layer, which has improved structural stability, enhanced air permeability and increased ionic conductivity.

The technical problem to be solved in the present disclosure is not limited to such matter, and it should be understood that another technical problems being not mentioned above will be apparent from the following description of the present disclosure.

Technical Solution

In accordance with one aspect of the present disclosure, there is provided a separator for an electrochemical device, comprising: a porous polymer film; and a porous coating layer formed on one or both surfaces of the porous polymer film and comprising at least one of inorganic particles and organic particles, and a binder polymer, wherein fibrils in the surface of the porous polymer film are entangled with the particles in the porous coating layer in the contact surface between the porous polymer film and the porous coating layer, and the separator has an air permeability of 100 to 800 sec/100 cc, an electrical resistance of 0.5 to 1.5Ω, and a heat-shrinkage rate of 8% or less in each of machine and transverse directions.

The separator for an electrochemical device may have a tensile strength of 1,500 to 2,500 kg/cm$^2$, and a puncture strength of 480 to 1,000 kgf.

The fibrils and the particles may be entangled with each other by 10 to 200 nm in the thickness direction from the surface of the porous polymer film.

The porous coating layer has a peeling force to the porous polymer film of no less than 5,000 gf/cm.

The porous polymer film may be a porous polyolefin film.

The porous polyolefin film may be selected from polyethylene; polypropylene; polybutylene; polypentene; polyhexene; polyoctene; a copolymer of at least one of ethylene, propylene, butene, pentene, 4-methylpentene, hexene and octene; and a mixture thereof.

The porous polymer film has a thickness of 5 to 50 μm, a pore size of 0.01 to 50 μm, and a porosity of 10 to 95%.

The binder polymer may be any one selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, and a mixture thereof.

The inorganic particles may be inorganic particles having a dielectric constant of 5 or higher, inorganic particles having the ability to transport lithium ions, or a mixture thereof.

The inorganic particles having a dielectric constant of 5 or higher may be selected from $BaTiO_3$, $Pb(Zr_x,Ti_{1-x})O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT), hafnia (HfO$_2$), SrTiO$_3$, SnO$_2$, CeO$_2$, MgO, NiO, CaO, ZnO, ZrO$_2$, Y$_2$O$_3$, Al$_2$O$_3$, TiO$_2$, SiC and a mixture thereof.

The inorganic particles having the ability to transport lithium ions may be selected from lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO$_4$)$_3$, 0<x<2, 0<y<1, 0<z<3), (LiAlTiP)$_x$O$_y$ type glass (0<x<4, 0<y<13), lithium lanthanum titanate (Li$_x$La$_y$TiO$_3$, 0<x<2, 0<y<3), lithium germanium thiophosphate (Li$_x$Ge$_y$P$_z$S$_w$, 0<x<4, 0<y<1, 0<z<1, 0<w<5), lithium nitride (Li$_x$N$_y$, 0<x<4, 0<y<2), SiS$_2$ type glass (Li$_x$Si$_y$S$_z$, 0<x<3, 0<y<2, 0<z<4), P$_2$S$_5$ type glass (Li$_x$P$_y$S$_z$, 0<x<3, 0<y<3, 0<z<7), and a mixture thereof.

The organic particles may be selected from polystyrene, polyethylene, polyimide, melamine resins, phenolic resins, cellulose, cellulose modifiers, polypropylene, polyester, polyphenylene sulfide, polyaramid, polyamideimide, polyimide, a copolymer of butyl acrylate and ethyl methacrylate, and a mixture thereof.

The inorganic particles and the organic particles each independently have an average diameter of 0.001 to 10 μm.

The porous polymer film has the structure that a plurality of fibrils are disposed in parallel with the surface of the film and are laminated in layers. The fibrils disposed on one surface of the film where the porous coating layer is formed may have a diameter smaller than that of the fibrils disposed in the central of the film in the thickness direction thereof.

The fibrils disposed on one surface of the film where the porous coating layer is formed may have a diameter being 2 to 4 times smaller than that of the fibrils disposed in the central of the film in the thickness direction thereof.

The fibrils disposed on one surface of the film where the porous coating layer is formed may have a diameter of 0.01 to 0.04 μm, and the fibrils disposed in the central of the film in the thickness direction thereof may have a diameter of 0.04 to 0.08 μm.

The porous polymer film has a porous coating layer formed on only one surface thereof, and fibrils disposed on one surface of the film where the porous coating layer is formed may have a diameter smaller than that of fibrils disposed on another surface of the film where the porous coating layer is not formed.

The fibrils disposed on one surface of the film where the porous coating layer is formed may have a diameter being 2 to 7 times smaller than that of the fibrils disposed on another surface of the film where the porous coating layer is not formed.

The fibrils disposed on one surface of the film where the porous coating layer is formed may have a diameter of 0.01 to 0.07 μm, and the fibrils disposed on another surface of the film where the porous coating layer is not formed may have a diameter of 0.07 to 0.14 μm.

The binder polymer is present on the surface of neighboring particles to connect the particles with each other and form a porous structure, and may have a size of 10 to 100 nm.

Also, in accordance with another aspect, there is provided an electrochemical device, comprising a cathode, an anode, and the above-mentioned separator interposed between the cathode and the anode.

The electrochemical device may be a lithium secondary battery.

Advantageous Effects

According to one embodiment of the present disclosure, a porous polyolefin film is coated by way of slurry coating that allows heat-setting at a higher temperature than a conventional heat-setting temperature, thereby providing a composite separator having improved mechanical and thermal properties and good air permeability.

Also, since the composite separator having a porous coating layer is prepared through slurry coating and heat-setting, heat applied in heat-setting is transferred from the porous coating layer to the polyolefin film, thereby allowing heat-setting at a relatively high temperature and eventually improving the wetting property of the coating slurry to the fibril structure of the polyolefin film.

In addition, since the heat applied in heat-setting is transferred from the porous coating layer to the polyolefin film, the polyolefin film has fibrils with a smaller diameter, has increased fibrilar number density per unit area and has increased interface contact area with a coating slurry forming the porous coating layer. Thereby, the polyolefin film easily maintains its physical form to improve the heat shrinkage rate of the composite separator and to enhance the peeling force of the coating layer.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

The patent or application file contains at least one color drawing. Copies of this patent or patent application publication with color drawing will be provided by the USPTO upon request and payment of the necessary fee.

BEST MODE

Figure 1:
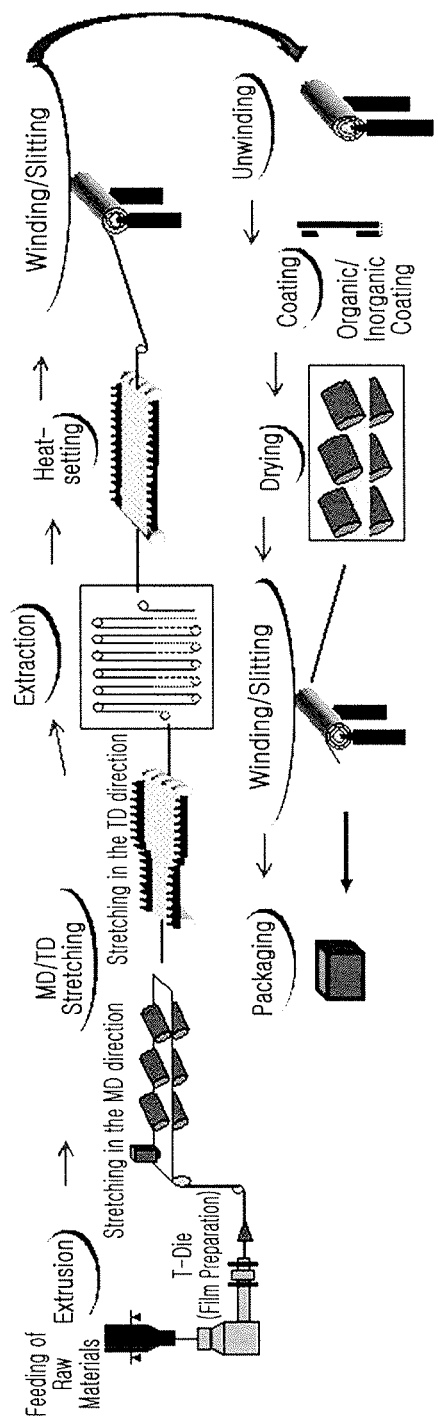
FIG. 1 is a schematic diagram showing a conventional process for preparing a separator for an electrochemical device.

Hereinafter, preferred embodiments of the present disclosure will be described in detail with reference to the drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Accordingly, the configurations illustrated in the drawings and the embodiments herein are just preferable examples for the purpose of illustrations only, not intended to limit the scope of the disclosure, so it should be understood that other equivalents and modifications could be made thereto without departing from the spirit and scope of the disclosure.

The separator for an electrochemical device according to one aspect of the present disclosure comprises a porous polymer film; and a porous coating layer formed on one or both surfaces of the porous polymer film and comprising at least one of inorganic particles and organic particles, and a binder polymer, wherein fibrils in the surface of the porous polymer film are entangled with the particles in the porous coating layer in the contact surface between the porous polymer film and the porous coating layer, and the separator has an air permeability of 100 to 800 sec/100 cc, an electrical resistance of 0.5 to 1.5Ω, and a heat-shrinkage rate of 8% or less in each of machine and transverse directions.

The porous polymer film has the structure that a plurality of fibrils are disposed in parallel with the surface of the film and are laminated in layers.

As used herein, the term "fibrils" refer to the union of polymer chains that are stretched and oriented during the preparation of the porous polymer film and have increased bonding force between neighboring molecular chains, thereby being united in the longitudinal direction.

FIG. 1 schematically shows a conventional process for preparing a separator having a porous coating layer formed by a wet method, which comprises extruding/casting, stretching, extracting and heat-setting of a resin composition to obtain the porous polymer film, and coating a slurry for forming the porous coating layer on the porous polymer film, followed by drying. The separator having a porous coating layer thus prepared has a fibril-structure obtained during stretching after phase-separation of a solid phase/a liquid phase or a liquid phase/a liquid phase, and such a structure is finally determined by heat-setting. That is, since the conventional process conducts the heat-setting of the porous polymer film prior to coating of the slurry for the porous coating layer, heat is uniformly applied to the porous polymer film during heat-setting and the fibrils of the separator prepared have a uniform diameter in the thickness direction of the porous polymer film.

Figure 2:
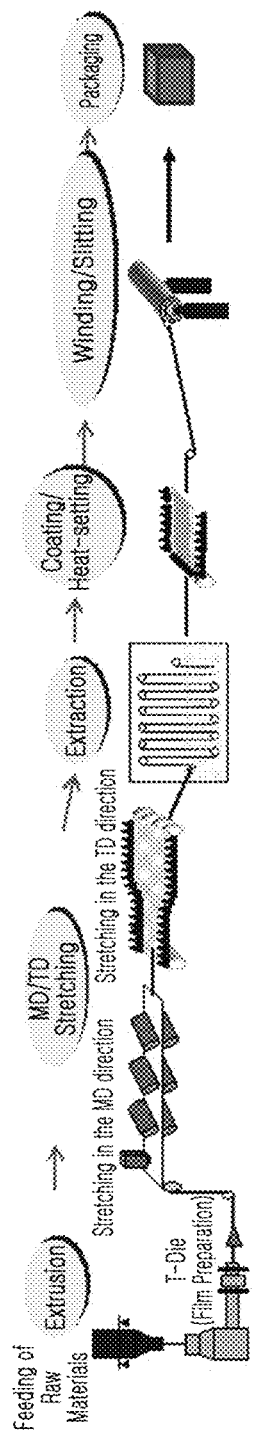
FIG. 2 is a schematic diagram showing a process for preparing a separator for an electrochemical device according to one embodiment of the present disclosure.

Meanwhile, FIG. 2 schematically shows a process for preparing a separator for an electrochemical device according to one embodiment of the present disclosure, in which the slurry for the porous coating layer is coated on a porous polymer film obtained by extracting a plasticizer, and then heat-setting is conducted. That is, the heat-setting is not conducted prior to the slurry coating.

As a result, since the separator for an electrochemical device according to one embodiment of the present disclosure has a porous coating layer that is already formed on at least one surface of the porous polymer film prior to heat-setting, heat is un-uniformly applied to the porous polymer film in the thickness direction of the film during heat-setting and the fibrils of the separator prepared have a different diameter in the thickness direction of the porous polymer film.

The heat transfer into the porous polyolefin film during heat-setting may be varied depending on whether the porous coating is formed on one surface or both surfaces, from which the diameter distribution of final fibrils may be affected.

Figure 3:
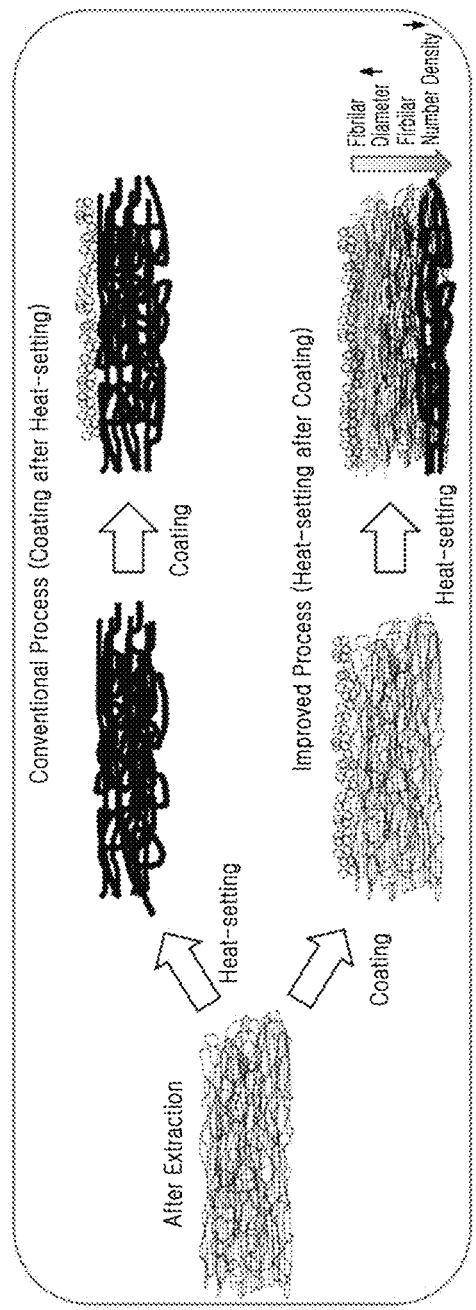
FIG. 3 schematically shows comparison of a fibril structure in a separator for an electrochemical device prepared by a conventional process and that in a separator for an electrochemical device prepared by one embodiment of the present disclosure.

For example, in the case of the separator wherein a porous coating layer is formed on only one surface of the porous coating film according to one embodiment of the present disclosure, it can be seen the effect that the heat-setting is directly or indirectly applied. In the separator wherein a porous coating layer is formed on only one surface of the porous coating film, when the heat-setting is applied after the formation of the porous coating layer, the porous polymer film with a slurry for the porous coating layer is indirectly affected by heat, thereby inducing relatively slow heat transfer. Meanwhile, when heat-setting is directly applied in the porous polymer film with no porous coating layer, the porous polymer film is directly affected by heat, thereby making large crystals and long-diameter fibrils due to partial melting and recrystallization. As a result, an increasing gradient of the fibril diameter occurs in the thickness direction of the film from the film surface with the porous coating layer into the other surface with no porous coating layer. On the contrary, in the conventional method that conducts the coating of a slurry after the porous coating film is subject to heat-setting, the fibrils exhibits a uniform diameter in the thickness direction of the film (See FIG. 3).

Also, in the case of the separator wherein a porous coating layer is formed on both surfaces of the porous coating film according to one embodiment of the present disclosure, the surfaces of the porous polymer film coated with a slurry on the top and the bottom of the film are indirectly affected by heat during heat-setting, but the center of the film is directly affected by heat through the right and left sides of the film with no substantial coating layer. As a result, the fibrils present in the surfaces of the film with the porous coating layer have a diameter smaller than that of fibrils present in the center of the film in the thickness direction thereof.

Of course, as discussed above, in the case that the porous coating layer is formed on only one surface of the porous polymer film, the diameter of the fibrils in the surface of the film with the porous coating layer is smaller than that of fibrils in the center of the film in the thickness direction thereof.

From such a distinct fibril structure, the porous polymer film of the separator according to one embodiment of the present disclosure has good thermal stability and good mechanical stability as follows.

Figure 5A:
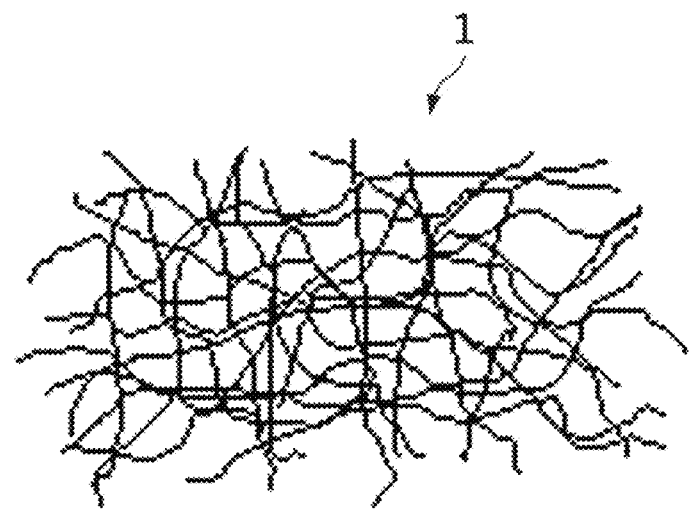
FIGS. 5a to 5c schematically show a method for preparing the composite separator of the present disclosure.
Figure 5B:
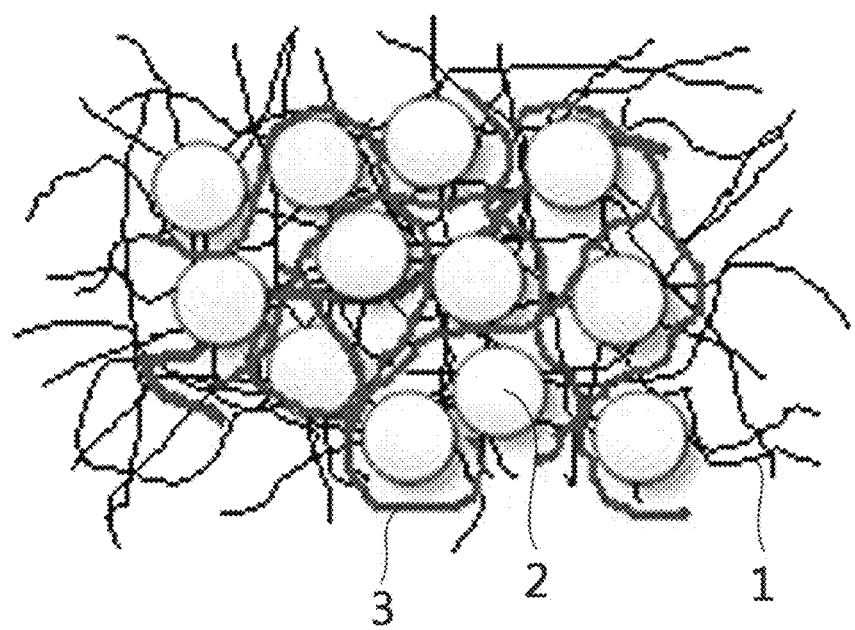
Figure 5C:
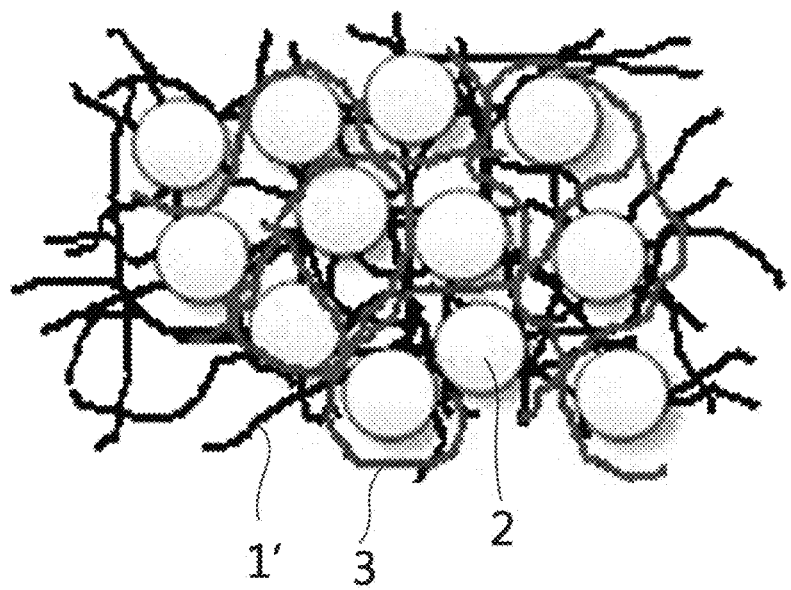
Figure 5D:
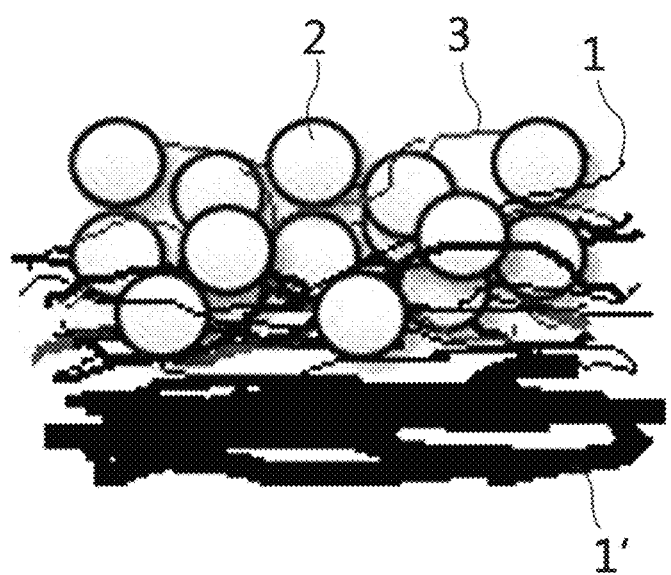
FIG. 5d is a schematic view of a cross-section of the composite separator of the present disclosure prepared.

As shown in FIGS. 5c and 5d, in the separator according to one embodiment of the present disclosure, fibrils 1, 1' in the surface of the porous polymer film are entangled with one or more particles 2 of inorganic particles and organic particles present in the porous coating layer in the contact surface between the porous polymer film and the porous coating layer. Also, the porous coating layer further comprises a binder polymer 3.

Meanwhile, the thermal stability of the composite separator with the a porous coating layer on at least one surface of the porous polymer film may vary depending on the heat-shrinkage rate of the porous polymer film, the loading amount of the porous coating layer, and the adhesive strength (or peeling strength) between the porous polymer film and the porous coating layer. Among these, it is known that weak adhesive strength between the porous polymer film and the porous coating layer may deteriorate thermal property even if the heat-shrinkage rate of the porous polymer film and the loading amount of the porous coating layer are improved.

Also, a separator with a conventional porous coating layer comprising particles and a binder polymer has a restricted improvement in mechanical strength because it fails to form strong adhesiveness in the desired degree between the porous polymer film and the porous coating layer by the binder polymer.

Figure 4A:
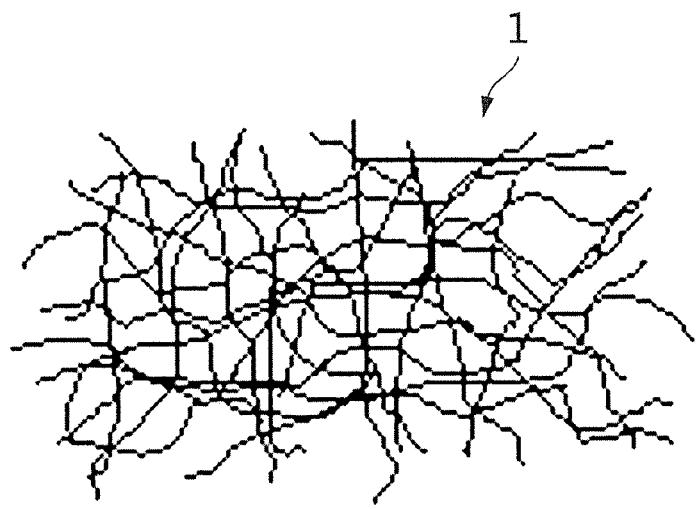
FIGS. 4a to 4c schematically show a method for preparing a conventional composite separator.
Figure 4B:
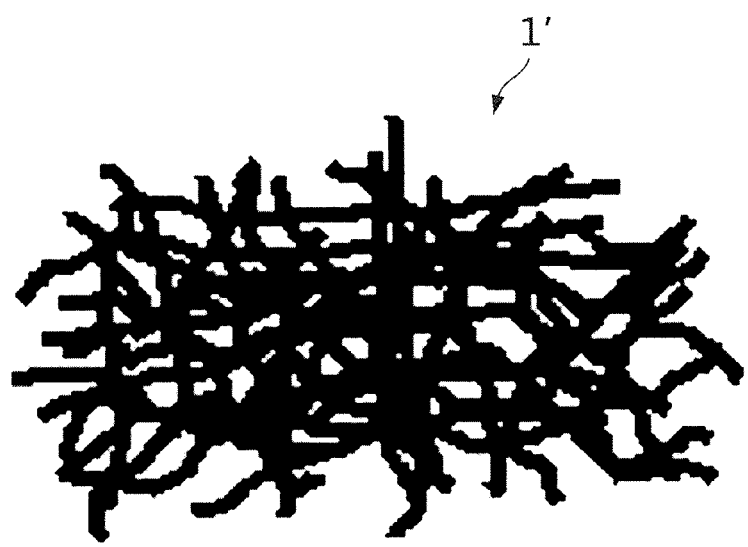
Figure 4C:
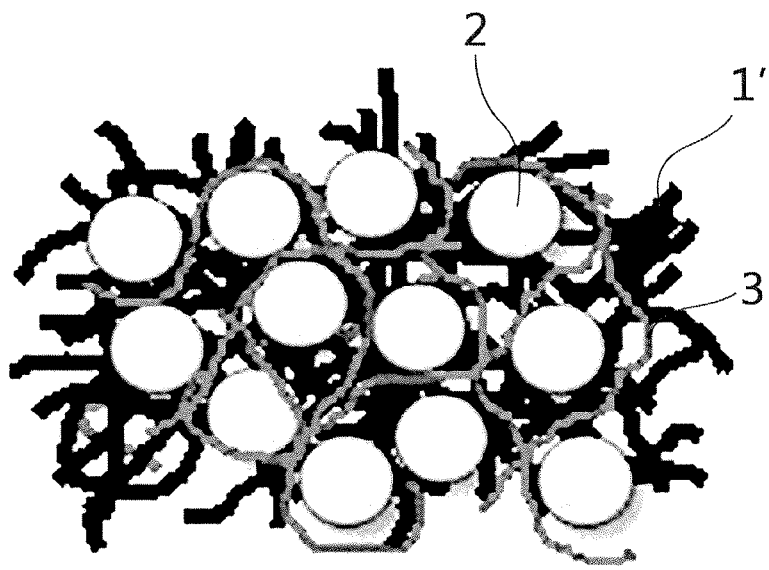
Figure 4D:
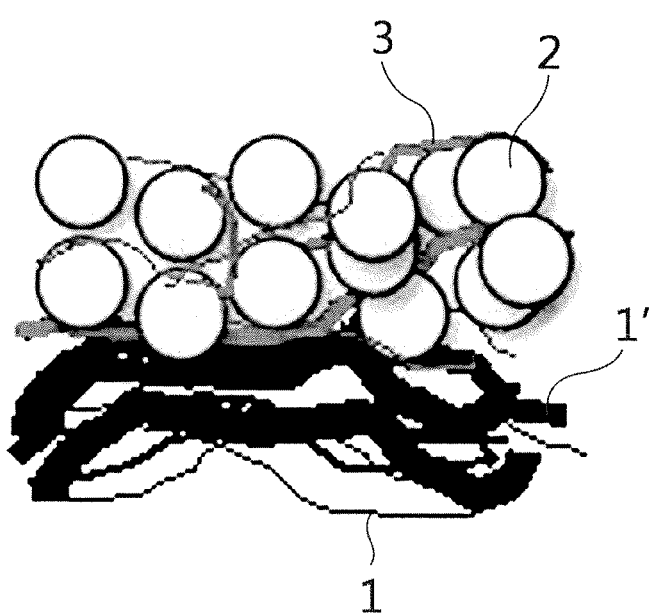
FIG. 4d is a schematic view of a cross-section of the conventional composite separator prepared.

In the conventional composite separator, the fibrils composing the porous polymer film are changed in the bonding state (indicated by (1) in FIG. 4a) before heat-setting and the bonding state (indicated by (1') in FIG. 4b) after heat-setting prior to the coating of a slurry for forming the porous coating layer, so fibrils in the surface of the porous polymer film are not entangled with one or more particles 2 of inorganic particles and organic particles (See FIGS. 4c and 4d).

Figure 6A:
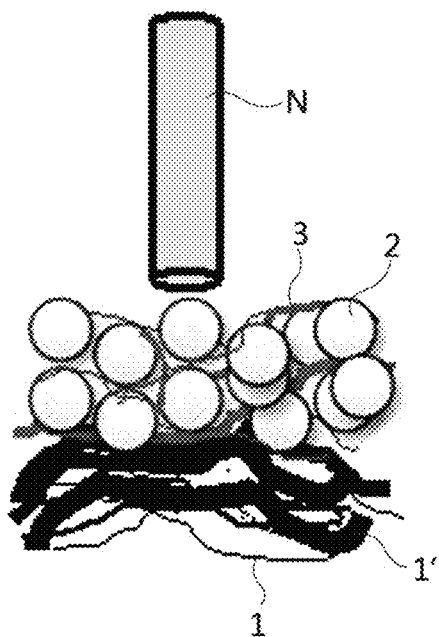
FIGS. 6a to 6c schematically show the behaviors of the conventional composite separator when applying impact thereto.
Figure 6B:
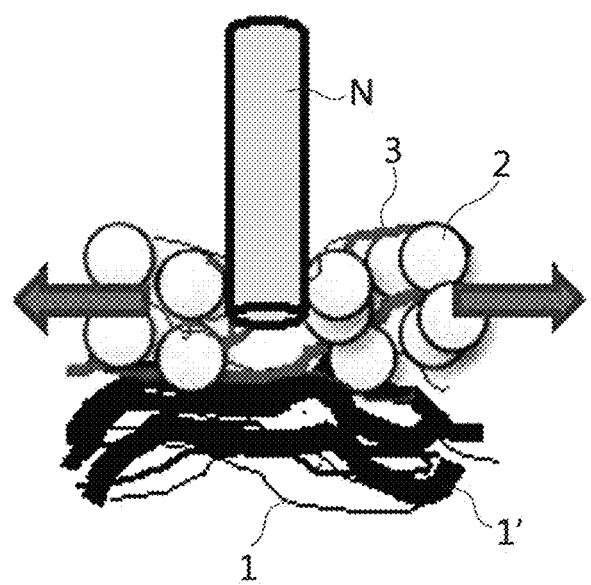
Figure 6C:
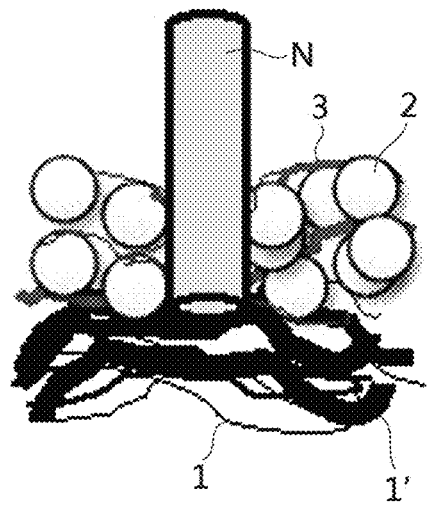

Also, when applying physical impact to the conventional composite separator, since it fails to form strong adhesiveness between the porous polymer film comprising fibrils 1' bonded by heat-setting and the porous coating layer comprising particles 2 on the porous polymer film as shown in FIGS. 6a to 6c, the particles in the porous coating layer may be easily released from the porous polymer film, and thus the puncture strength of the separator is substantially determined by the mechanical strength of the porous polymer film. The mechanical strength of the porous polymer film is known to depend on the stretching and heat-setting of the porous polymer film, as well as the adhesive strength between the porous polymer film and the porous coating layer. In the drawings, N indicates the object for imparting impact to the separator.

From this point, the present inventors have found that the thermal stability and the mechanical stability of the separator can be simultaneously improved by increasing the adhesive strength (or peeling strength) between the porous polymer film and the porous coating layer.

As mentioned above, the separator for an electrochemical device according to the present disclosure may be prepared by extruding/casting a resin composition comprising a polymer resin and a plasticizer to obtain a polymer film, stretching the obtained film, extracting the plasticizer from the stretched film, coating a slurry for a porous coating layer on at least one surface of the plasticizer-free porous polymer film, and bringing the slurry-coated porous polymer film into heat-setting.

That is, in the present disclosure, the porous polymer film is coated with the slurry for a porous coating layer before the surface fibrils of the film are subject to heat-setting (See FIGS. 5a to 5c). Accordingly, particles contained in the slurry for a porous coating layer are entangled between non-bonded fibrils formed in the surface of the porous polymer film, thereby more strengthening the bonding force between the porous polymer film and the porous coating layer (See FIGS. 5c to 5d).

As a result, the peeling force of the porous coating layer to the porous polymer film is 5,000 gf/cm or more, preferably 7,000 to 20,000 gf/cm. As used herein, the term 'peeling force of the porous coating layer' refers to a force measured by the following test.

That is, each sample (width 1.5 cm, length 6-8 cm) of the separator of the present disclosure is firmly attached on a glass plate with a transparent double-sided tape (3M). Then, a force that requires to detach the porous active layer from the base film is measured using a tensile tester (UTM, LLOYD LF PLUS), thereby evaluating the peeling force of the porous active layer.

The fibrils of the porous polymer film and the particles of porous coating layer may be entangled with each other by 10 to 200 nm, preferably 20 to 100 nm in the thickness direction from the surface of the porous polymer film. The porous polymer film and the porous coating layer are overlapped with each other within such depth range.

As a result, the separator of the present disclosure has a heat-shrinkage rate of 8% or less in each of machine and transverse directions.

Also, when the heat-setting is carried out after forming the porous coating layer on the porous polymer film according to one embodiment of the present disclosure, the porous polymer film is indirectly affected by heat through the porous coating layer, and thus relatively slow heat transfer occurs. Thereby, air permeability can be largely improved without the closure of pores in the porous polymer film. The air permeability is 100 to 800 sec/100 cc, preferably 200 to 700 sec/100 cc.

As mentioned above, the fibrils disposed on the surface of the film where the porous coating layer is formed may have a diameter smaller than that of the fibrils disposed in the central of the film in the thickness direction thereof. Particularly, in the case that the porous coating layer is formed on only one surface of the porous polymer film, since an increasing gradient of the fibril diameter occurs in the thickness direction of the film from the film surface with the porous coating layer into the other surface with no porous coating layer, the separator has a low electrical resistance of 0.5 to 1.5Ω, preferably 0.6 to 1.0Ω.

Also, according to one embodiment of the present disclosure, the heat-setting may be carried out at a temperature higher than the conventional heat-setting temperature due to the presence of the porous coating layer, i.e., at a temperature being 1° C. lower than the melting point of the porous polymer film (e.g., 131 to 134° C. for polyethylene film). Thereby, the fibrilar bonding density becomes more improved, and also the mechanical strength of the porous polymer film itself becomes increased. As a result, the separator according to one embodiment of the present disclosure may have a tensile of 1,500 to 2,500 kg/cm$^2$, preferably 2,000 to 2,500 kg/cm$^2$.

Figure 7A:
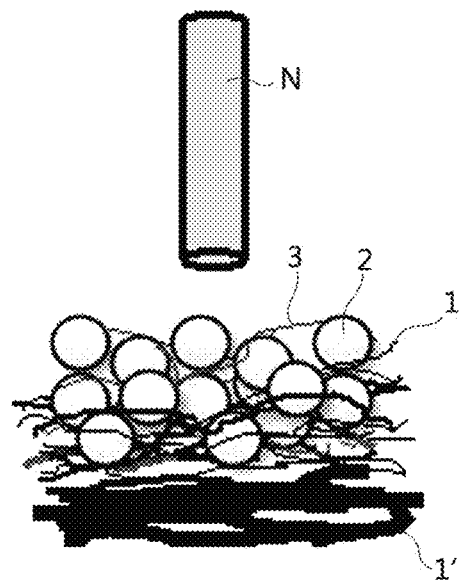
FIGS. 7a and 7b schematically show the behaviors of the composite separator of the present disclosure when applying impact thereto.
Figure 7B:
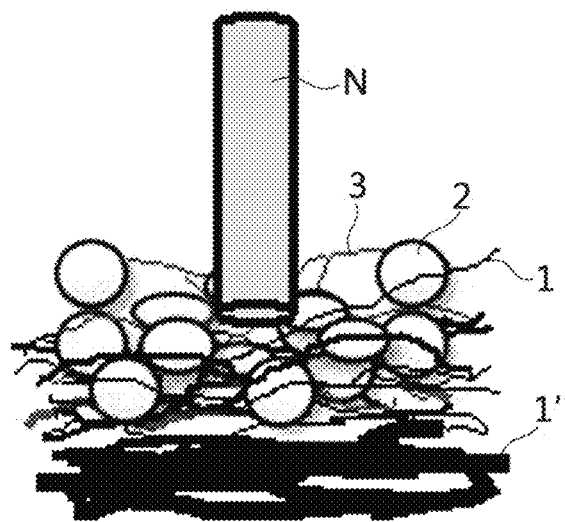

Furthermore, as can be seen from FIGS. 7a and 7b, when applying impact, the composite separator may have increased puncture strength by inorganic particles/organic particles 2 entangled with fibrils 1 in the surface of the porous polymer film. More specifically, the separator according to one embodiment of the present disclosure may have a puncture strength of 480 to 1,000 kgf, preferably 500 to 1,000 kgf.

According to one embodiment of the present disclosure, the fibrils disposed on one surface of the film where the porous coating layer is formed may have a diameter being 2 to 4 times, preferably 2 to 3 times smaller than that of the fibrils disposed in the central of the film in the thickness direction thereof.

Also, the fibrils disposed on one surface of the film where the porous coating layer is formed may have a diameter of 0.01 to 0.04 μm, and the fibrils disposed in the central of the film in the thickness direction thereof may have a diameter of 0.04 to 0.08 μm.

As mentioned above, in the case that the porous coating layer is formed on only one surface of the porous polymer film, fibrils disposed on one surface of the film where the porous coating layer is formed may have a diameter smaller than that of fibrils disposed on another surface of the film where the porous coating layer is not formed.

In this case, the fibrils disposed on one surface of the film where the porous coating layer is formed may have a diameter being 2 to 7 times, preferably 4 to 7 times smaller than that of the fibrils disposed on another surface of the film where the porous coating layer is not formed.

Specifically, the fibrils disposed on one surface of the film where the porous coating layer is formed may have a diameter of 0.01 to 0.07 μm, and the fibrils disposed on another surface of the film where the porous coating layer is not formed may have a diameter of 0.07 to 0.14 μm.

Also, one surface of the film where the porous coating layer is formed exhibits increased fibrilar number density per unit area, and this can increase an interface contact area with the coating slurry and can improve the wetting property of the slurry to the porous fibrous structure of polyolefins. Also, the mechanical strength of the separator can be maximized by heat-setting, and air permeability and ionic conductivity can also be enhanced.

The porous polymer film may be any one which is conventionally used in the art, and an example of the porous polymer film is a polyolefin film.

The polyolefin is not particularly limited if it is conventionally used in the art. Specific examples of the polyolefin may include polyethylene such as high-density polyethylene (HDPE), low-density polyethylene (LDPE), linear low-density polyethylene (LLDPE), and ultra-high molecular weight polyethylene (UHMWPE); polypropylene; polybutylene; polypentene; polyhexene; polyoctene; a copolymer of at least one of ethylene, propylene, butene, pentene, 4-methylpentene, hexene and octene; and a mixture thereof.

The thickness of the porous polymer film is not particularly limited, but preferably 5 to 50 μm. Also, the size of pores present in the porous substrate and the porosity thereof are not particularly limited, but preferably 0.001 to 50 μm and 10 to 99%, respectively.

The porous coating layer may comprise inorganic particles alone, organic particles alone, or a mixture of the inorganic particles and the organic particles. The inorganic particles are not particularly limited if they are electrochemically stable. That is, the inorganic particles which may be used in the present disclosure are not particularly limited unless an oxidation-reduction reaction occurs in an operating voltage range (for example, 0 to 5 V based on Li/Li$^+$) of an applied electrochemical device. Particularly, inorganic particles having the ability to transport lithium ions may be used to increase an ionic conductivity in electrochemical devices, thereby enhancing the performances thereof. Also, inorganic particles having a high dielectric constant may be used to increase a dissociation rate of an electrolyte salt, e.g., a lithium salt, in a liquid electrolyte, thereby improving an ionic conductivity of the electrolyte.

Non-limiting examples of the inorganic particles may include inorganic particles having a dielectric constant of 5 or higher, preferably 10 or higher, inorganic particles having the ability to transport lithium ions, or a mixture thereof.

Non-limiting examples of the inorganic particles having a dielectric constant of 5 or higher include $BaTiO_3$, $Pb(Zr,Ti)O_3$ (PZT), $Pb_{1-x}La_xZr_{1-y}Ti_yO_3$ (PLZT), $Pb(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC and a mixture thereof.

In the present disclosure, the term "inorganic particles having the ability to transport lithium ions" refer to lithium-containing inorganic particles which can transfer lithium ions without holding them. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as $LiI$—$Li_2S$—$P_2S_5$, and a mixture thereof.

Also, the organic particles are favorable in terms of air permeability, heat-shrinkage, and peeling strength, and have good bonding force with the binder polymer.

Non-limiting examples of the organic particles may include various polymers, for example, polystyrene, polyethylene, polyimide, melamine resins, phenolic resins, cellulose, cellulose modifiers (such as carboxymethyl cellulose), polypropylene, polyester (such as polyethylene terephthalate, polyethylene naphthalate, polybutylene terephthalate), polyphenylene sulfide, polyaramid, polyamideimide, polyimide, a copolymer of butyl acrylate and ethyl methacrylate (such as a crosslinked polymer of butyl acrylate and ethyl methacrylate), and a mixture thereof. The organic particles may consist of two or more kinds of polymers.

The inorganic particles and the organic particles are not particularly limited to their size, but preferably they each have an average diameter of 0.001 to 10 μm for the formation of a coating layer having a uniform thickness and a proper porosity.

The binder polymer is not particularly limited if it functions to stably immobilize an connect one or more particles of the inorganic particles and the organic particles. Non-limiting examples of the binder polymer may include polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, and a mixture thereof.

The composition ratio of the particles and the binder polymer in the porous coating layer may be, for example, 50:50 to 99:1 (wt:wt), or 70:30 to 95:5 (wt:wt). If the content of the particles is very small relative to the binder polymer, the thermal stability of the separator may be deteriorated, and vacant spaces are not sufficiently formed between the particles to lower pore size and porosity, thereby deteriorating the performances of the final battery. If the content of the particles is very excessive relative to the binder polymer, the anti-peeling property of the porous coating layer may be weakened.

The separator of the present disclosure may be prepared as follows.

Firstly, a resin composition comprising a polymer resin and a plasticizer is extruded.

The plasticizer is not particularly limited if it has been conventionally used in the art. Non-limiting examples of the plasticizer may include esters of phthalic acid, such as dibutyl phthalate, dihexyl phthalate, dioctyl phthalate; aliphatic esters such as diphenyl ether and benzyl ether; $C_{10}$-$C_{20}$ fatty acids such as palmitic acid, stearic acid, oleic acid, linoleic acid, and linolenic acid; $C_{10}$-$C_{20}$ fatty alcohols such as palmityl alcohol, stearyl alcohol and oleyl alcohol; $C_4$-$C_{26}$ saturated and unsaturated fatty acids, such as mono-, di- or tri-esters of palmitic acid, mono-, di- or tri-esters of stearic acid, mono-, di- or tri-esters of oleic acid, mono-, di- or tri-esters of linoleic acid; esters of fatty acids obtained from the combination of one or more unsaturated fatty acids whose double bond is substituted with an epoxy group with $C_1$-$C_{10}$ alcohols or esters having 1 to 8 hydroxy groups.

Also, the plasticizer may be a mixture of two or more of the above-mentioned kinds.

The weight ratio of the polymer resin and the plasticizer may be 80:20 to 10:90, preferably 70:30 to 20:80, more preferably 50:50 to 30:70. If the weight ratio exceeds the range of 80:20, i.e., the content of the polymer resin increases, the porosity is reduced, the pore size becomes small, the interconnection between pores is lowered to deteriorate transmittance, the viscosity of the polymer resin solution is raised to increase the extrusion load, leading to poor processibility. If the weight ratio is less than 10:90, i.e., the content of the polymer resin decreases, the miscibility of the polymer resin and the plasticizer is deteriorated, so the polymer resin is extruded in the form of a gel without the thermodynamic miscible of the polymer resin with the plasticizer, thereby causing rupture or un-uniform thickness during stretching and deteriorating the strength of the prepared separator.

In the present disclosure, in order to prepare a composite separator, the whole or a part of raw materials are mixed using a Henschel mixer, a ribbon blender, or a tumbler blender. Subsequently, melt-mixing is carried out using screw extruders such as single screw extruder or twin screw extruder, blenders and mixers, and extrusion is carried out using a T die or a tubing die. The mixed/extruded melts may be solidified by compression and refrigeration, and the refrigeration may be carried out by way of direct contact with a cooling medium such as cold wind or cold water, or by way of contact with a roll or a press cooled by the cooling medium.

Then, the extruded resin composition is stretched to obtain a polymer resin film. The stretching may be carried out by a conventional method known in the art. Non-limiting example of thereof may include uniaxial stretching in the machine (longitudinal) direction (MD) by a roller, uniaxial stretching in the transverse direction (TD) by a tender, successive biaxial stretching by combination of a roller and a tender, or by combination of a tender and a tender, or simultaneous biaxial stretching by simultaneous biaxial tenders or by inflation molding. Specifically, the extruded resin composition may be uniaxially stretched more than once in the MD or TD direction, or may be biaxially stretched more than once in the MD and the TD directions.

The stretching ratio may be 3 times or more, preferably 5 to 10 times in each of the MD and the TD directions, and the total stretching ratio (sum of face magnifications) may be 20 times or more, preferably 20 to 80 times. If the stretching ratio in one direction is less than 3 times, the orientation in one direction becomes insufficient, and property balance between the MD and the TD directions is broken, thereby deteriorating tensile strength and puncture strength. Also, if the total stretching ratio is less than 20 times, unstretching may occur and pores may be not formed. If the total stretching ratio is higher than 80 times, rupture during stretching occurs, and the shrinkage of the final film may increase.

The stretching temperature may be varied depending on the melting point of the used polymer resin and the concentration and kind of the plasticizer. Preferably, the stretching temperature may be properly selected within a temperature that melts 30 to 80 wt % of the crystals of the polymer resin in the film.

If the stretching temperature is less than a temperature that melts 30 wt % of the crystals of the polymer resin in the film, the stretching becomes poor due to no softness of the film, and the film may be ruptured during stretching or may not be stretched. If the stretching temperature is higher than a temperature that melts 80 wt % of the crystals of the polymer resin, the stretching may be easily carried out but a thickness deviation may occur due to partial overstretching and the orientation effect of the resin becomes poor and the properties may be deteriorated. The degree that crystals melt depending on the temperature may be measured by analyzing the film mold through differential scanning calorimeter (DSC).

Subsequently, the plasticizer is extracted from the stretched film to obtain a porous polymer film.

Specifically, the plasticizer is extracted from the stretched film using an organic solvent, followed by drying.

The extraction solvent used to extract the plasticizer is preferably a poor solvent for the polymer resin, while is a good solvent for the plasticizer, and preferably has the boiling point less than the melting point of the polymer resin for rapid drying. Non-limiting examples of the extraction solvent may include hydrocarbons such as n-hexane and cyclohexane, halogenated hydrocarbons such as methylene chloride, 1,1,1-trichloroethane and fluorocarbons, alcohols such as ethanol and isopropanol, and ketones such as acetone and 2-butanone.

The extraction may be carried out by various methods known in the art, including immersion, solvent spray, ultrasonic, and a combination thereof. After extraction, the content of remaining plasticizer should be 1 wt % or less. If the content of remaining plasticizer is higher than 1 wt %, properties may be deteriorated and the transmittance of the porous film may decrease. The content of remaining plasticizer may depend on the extraction temperature and extraction time. The extraction temperature may be higher so as to increase the solubility of the plasticizer in the organic solvent, but preferably 40° C. in terms of safety for the boiling of the organic solvent. The extraction temperature should be necessarily higher than the freezing point of the plasticizer since the extraction efficiency is largely reduced at a temperature less than the freezing point of the plasticizer.

Also, the extraction time may be varied depending on the thickness of the porous polymer film. The extraction time is suitably 2 to 4 minutes when the film has a thickness of 10 to 30 μm.

The porous polymer film obtained above is not particularly limited to its thickness, but it is preferably to have a thickness of 5 to 50 μm. Also, the size and porosity of pores present in the porous substrate are not particularly limited, but the pore size is preferably 0.01 to 50 μm and the porosity is preferably 10 to 99%.

Then, a slurry for a porous coating layer is coated on at least one surface of the porous polymer film. For this, the slurry for a porous coating layer is obtained by dispersing one or more particles of inorganic particles and organic particles and a binder polymer in a solvent. That is, the slurry may comprise the inorganic particles alone, the organic particles alone, or a mixture thereof.

The solvent in the slurry functions to uniformly disperse the particles and the binder polymer and should be easily removed later. Non-limiting examples of usable solvents may include acetone, tetrahydrofuran, methylene chloride, chloroform, dimethylformamide, N-methyl-2-pyrrolidone (NMP), cyclohexane, water and a mixture thereof.

The slurry for a porous coating layer is coated on at least one surface of the porous polyolefin film by various coating methods known in the art, including dip coating, die coating, roll coating, comma coating, or a combination thereof. Also, the porous coating layer may be selectively formed on both surfaces or one surface of the porous polyolefin film.

Next, the porous polyolefin film coated with the slurry is subject to heat-setting to obtain a composite separator having a porous coating layer.

The heat-setting is to set the film to be shrunk by force and heat and remove residual stress. It is preferable that the higher heat-setting temperature is, the lower shrinkage rate is obtained. However, if the heat-setting temperature is excessively high, the polyolefin film is partially melted and micropores may be clogged to reduce transmittance.

In the present disclosure, the heat-setting is conducted after stretching into the polyolefin film, the extraction of the plasticizer and the coating of the slurry for a porous coating layer, unlike the conventional method that the heat-setting has been conducted after stretching into the polyolefin film and the extraction of the plasticizer. That is, since the heat-setting of the present disclosure is conducted for the slurry coated, not for the polyolefin film, heat is not directly applied to the polyolefin film.

Accordingly, even though the heat-setting is conducted at a higher temperature than the conventional method, the melting of the polyolefin film can be inhibited. Also, according to the heat-setting of the present disclosure, it can reduce heat directly applied to the polyolefin film, the polyethylene substrate adjacent to the porous coating layer has thinner fibrils. Therefore, the polyethylene substrate adjacent to the porous coating layer has increased fibrilar number density per unit area, from which the interface contact area with the coating slurry increases and the wetting property of the slurry to the fibril structure of the porous polyolefin film can be improved by heat-setting at a temperature higher than the glass transition temperature ($T_g$) or the melting point ($T_m$) of the coating slurry.

The temperature of the heat-setting is preferably controlled to a temperature of $T_m$–1° C., wherein $T_m$ is the melting point of polyolefin.

According to one embodiment of the present disclosure, when polyolefin, e.g., polyethylene is used as a polymer resin, the heat-setting may be carried out at a temperature of 131 to 134° C., preferably 131 to 133° C. When the heat-setting temperature satisfies such range, it can improve the adhesive strength (or peeling strength) between the porous polymer film and the porous coating layer and can ensure structural stability. Also, thermal and mechanical properties can be improved, and air permeability and specific resistance may be reduced.

Also, the heat-setting may be carried out using a heat source toward the direction perpendicular to the surface of the slurry coated on the porous polymer film. The heat source may be hot air generated from a hot air dryer, and any other sources may be used to obtain the effect of heat-setting.

In a conventional drying method at a relative low temperature after coating, the binder polymer in the coated slurry, particularly crystalline polymer with poor solubility is un-uniformly distributed in the coating layer after solvent evaporation.

On the contrary, in the heat-setting according to one embodiment of the present disclosure, since a heat source with a high temperature is applied in the direction perpendicular to the surface of the slurry coated on the porous polymer film, the crystalline binder polymer between particles or the crystalline binder polymer not being completely bonded with the particles is rearranged due to recrystallization by the heat source with a high temperature, thereby largely reducing resistance by un-uniform dispersion in the coating layer.

The porous coating thus formed is not particularly to its thickness, but it is preferably to have a thickness of 0.01 to 20 µm. Also, the size and porosity of pores present in the porous substrate are not particularly limited, but the pore size is preferably 0.001 to 10 µm and the porosity is preferably 10 to 99%. The pore size and the porosity largely depend on the size of the used particles. For example, the use of particles with a diameter of 1 µm or less forms pores of about 1 µm or less.

In the porous coating layer, the particles are bound to each other by the binder polymer in the state that the particles are filled in contact with each other, from which interstitial volumes are formed between the particles. The interstitial volumes between the particles become empty spaces to form pores.

That is, the binder polymer allows the particles to be attached with each other so that the particles can maintain their binding state. For example, the binder polymer immobilizes and connects the particles with each other. Also, the pores of the organic/inorganic composite porous membrane are formed as a result that the interstitial volumes between the particles become empty spaces, and the pores are a space restricted by inorganic particles being actually faced in a closed packed or densely packed structure of the particles. Such a pore structure is filled with an electrolyte solution to be introduced later and the electrolyte solution thus filled may provide a transfer path of lithium ions that are necessary for battery operation through the pores of the porous coating layer.

Meanwhile, as mentioned above, the method for preparing the separator according to one embodiment of the present disclosure does not need heat-setting, winding and slitting, and unwinding procedures after extraction of the plasticizer, unlike the conventional method shown in FIG. 1.

The winding refers to the step of winding the composite separator with a roller, the composite separator being obtained by going through slurry coating and heat-setting of the porous polymer film produced after extrusion/stretching/extraction.

The conventional method needs an unwinding procedure that unwinds the wound film again for slurry coating after heat-setting, winding and slitting of the porous polymer film. After slurry coating and drying, a winding and slitting procedure is again carried out prior to packaging.

According to one embodiment of the present disclosure, the winding and slitting procedures can be reduced from twice (conventional method) into once. This can prevent the partial loss of the porous polymer film during winding and slitting, thereby increasing the yield.

By such omission of the winding, slitting and unwinding procedures prior to slurry coating which have been carried out in the conventional method, space utilization may be induced and cost saving may be achieved. Furthermore, since the slitting, or the winding/unwinding are not carried out prior to slurry coating, it can achieve large coating over super wide area, and can reduce damage such as wrinkles, pin holes and scratches in the final separator. Also, uncoated area may be reduced.

In addition, the conventional method needs two separate heat-setting procedures after plasticizer extraction and after slurry coating, whereas the present disclosure carries out single heat-setting after slurry coating by using only a heat-setting oven, not two separate ovens for drying and for heat-setting. Thereby, space utilization may be induced and cost saving may be achieved.

In accordance with still another aspect of the present disclosure, there is provided an electrochemical device, comprising a cathode, an anode, and a separator interposed between the cathode and the anode, wherein the separator is the above-mentioned separator for an electrochemical device.

The electrochemical device may be manufactured by a conventional method known in the art, for example, by interposing the foregoing separator between a cathode and an anode and introducing an electrolyte solution.

The separator of the present disclosure may be used together with any electrode which is not particularly limited, and the electrode may be manufactured by binding an electrode active material to an electrode current collector according to a conventional method known in the art.

Among the electrode active materials, a cathode active material may be any of those that are commonly used in cathodes of conventional electrochemical devices. Non-limiting examples of the cathode active material include lithium manganese oxides, lithium cobalt oxides, lithium nickel oxides, lithium iron oxides, and lithium composite oxides thereof. An anode active material may be any of those that are commonly used in anodes of conventional electrochemical devices. Non-limiting examples of the anode active material include lithium, lithium alloys, and lithium intercalation materials such as carbon, petroleum coke, activated carbon, graphite and other carbonaceous materials.

Non-limiting examples of a cathode current collector include aluminum foils, nickel foils and a combination thereof. Non-limiting examples of an anode current collector include copper foils, gold foils, nickel foils, copper alloy foils and a combination thereof.

In one embodiment of the present disclosure, an electrolyte consisting of a salt and an organic solvent capable of dissolving or dissociating the salt may be used. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof.

The electrolyte may be introduced in any suitable step during the manufacturing of a battery depending on the manufacturing processes and desired physical properties of a final product. Specifically, the electrolyte may be introduced before battery assembly or in the final step of battery assembly.

Also, the separator according to one embodiment of the present disclosure may be applied in a battery by conventional winding, lamination or stacking with an electrode, and folding processes.

Hereinafter, various preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

Example 1-1: Preparation of Separator

High-density polyethylene ($M_w$ 500,000) as a polyolefin, and liquid paraffin (kinematic viscosity 68.00 cSt) as a plasticizer were used in a weight ratio of 35:65, followed by extraction at 210° C. The extruded polyolefin was stretched at 115° C., and the stretching ratio was 7 times in the each direction of the MD and the TD directions. Then, methylene chloride was used as an extraction solvent to extract the liquid paraffin used as the plasticizer under the condition of 2 M/min, to obtain a porous polyolefin film having an average pore size of 0.04 μm.

In order to prepare a slurry for a porous coating layer, $Al_2O_3$ particles (average diameter 0.5 μm)/cyanoethyl polyvinyl alcohol (Cyano resin CR-V, Shin-Etsu Chemical, Ltd.)/PVDF-HFP5 (LBG2, Arkema, Inc.)/acetone were mixed in a weight ratio of 18.0/0.3/1.7/80.

After the plasticizer was extracted, the slurry was coated on one surface of the porous polyolefin film in a thickness of 4 μm, and heat-setting was carried out at 132.5° C. and 5 m/min, to obtain a 20 μm-thick separator having a porous coating layer. The porous coating layer of the separator obtained had an average pore size of 0.5 μm and an average porosity of 56%.

Example 1-2: Preparation of Coin Cell 1.0M $LiPF_6$ was added in an organic solvent of ethylene carbonate/ethyl methyl carbonate (1:2, vol/vol), to obtain an electrolyte solution. The separator was sufficiently wet in the electrolyte solution, and the separator was used to prepare a coin cell.

Example 2-1: Preparation of Separator

In order to prepare a slurry for a porous coating layer, 0.5 μm-average diameter organic particles (Zeon, FX9022) consisting of a crosslinked polymer of butylacrylate and ethylmethacrylate, polybutylacrylate as a binder polymer, carboxylmethyl cellulose (CMC) as a dispersant, and water as a solvent were mixed in a weight ratio of 18/1.5/0.5/80. After the plasticizer was extracted, the slurry was coated on one surface of the porous polyolefin film in a thickness of 3.5 μm, and heat-setting was carried out at 132.5° C. and 5 m/min, to obtain a 14.5 μm-thick separator having a porous coating layer. The porous coating layer of the separator obtained had an average pore size of 0.5 μm and an average porosity of 60%.

Example 2-2: Preparation of Coin Cell

The procedures of Example 1-2 were repeated except that the separator of Example 2-1 was used to prepare an electrochemical device.

Comparative Example 1-1: Preparation of Separator

High-density polyethylene ($M_w$ 500,000) as a polyolefin, and liquid paraffin (kinematic viscosity 68.00 cSt) as a plasticizer were used in a weight ratio of 35:65, followed by extraction at 210° C. The extruded polyolefin was stretched at 115° C., and the stretching ratio was 7 times in the each direction of the MD and the TD directions. After extracting the plasticizer, heat-setting was carried out at 130° C. and 5 m/min, to obtain a porous polyolefin film.

In order to prepare a slurry for a porous coating layer, $Al_2O_3$ particles/cyanoethyl polyvinyl alcohol/PVDF-HFP/acetone were mixed in a weight ratio of 18.0/0.3/1.7/80.

The slurry was coated on both surfaces of the porous polyolefin film in a thickness of 4 μm, and heat-setting was carried out at 60° C. and 5 m/min, to obtain a separator.

Comparative Example 1-2: Preparation of Coin Cell

The procedures of Example 1-2 were repeated except that the separator of Comparative Example 1-1 was used to prepare an electrochemical device.

Comparative Example 2-1: Preparation of Separator

The procedures of Comparative Example 1-1 were repeated except that the heat-setting was carried out at 132.5° C. and 5 m/min to obtain a porous polyolefin film, thereby preparing a separator.

Comparative Example 2-2: Preparation of Coin Cell

The procedures of Example 1-2 were repeated except that the separator of Comparative Example 2-1 was used to prepare an electrochemical device.

Comparative Example 3-1: Preparation of Separator

The procedures of Comparative Example 2-1 were repeated except that 0.5 μm-average diameter organic particles (Zeon, FX9022) consisting of a crosslinked polymer of butylacrylate and ethylmethacrylate, polybutylacrylate as a binder polymer, carboxylmethyl cellulose (CMC) as a dispersant, and water as a solvent were mixed in a weight ratio of 18/1.5/0.5/80, to obtain a slurry for a porous coating layer, thereby preparing a separator for an electrochemical device.

Comparative Example 3-2: Preparation of Coin Cell

The procedures of Example 1-2 were repeated except that the separator of Comparative Example 3-1 was used to prepare an electrochemical device.

Comparative Example 4-1: Preparation of Separator

The procedures of Comparative Example 3-1 were repeated except that the heat-setting was carried out at 132.5° C. and 5 m/min to obtain a porous polyolefin film, thereby preparing a separator.

Comparative Example 4-2: Preparation of Coin Cell

The procedures of Example 1-2 were repeated except that the separator of Comparative Example 4-1 was used to prepare an electrochemical device.
Evaluation of Separator The separators prepared in Examples 1-1 and 1-2 and Comparative Examples 1-1 to 1-4 were measured for their thickness, tensile strength, puncture strength and heat-shrinkage rate. The results are shown in Table 1.

Also, for a nail penetration test, a cylindrical (18650) battery was fully charged and was pierced by a nail with a diameter of 2.5 mm at a speed of 5 mm/sec. For impact test, a bar with a diameter of 15.8 mm was put on the fully charged cylindrical (18650) battery, to which a 9.1 kg weight was dropped at a height of 630 mm to evaluate stability. In this case, each separator was regarded to pass the stability test when there is no ignition or explosion.

The cylindrical (18650) battery was prepared by the following method.

Firstly, ethylene carbonate, propylene carbonate, and methyl ethyl carbonate were used in a volume ratio of 20/10/70, to which 1M $LiPF_6$ was added to obtain a non-aqueous electrolyte solution.

62.4 Parts by weight of 3-components cathode active material ($LiN_{1/3}Co_{1/3}Mn_{1/3}O_2$), 1.3 parts by weight of Super-P™ as a conductive material, 1.3 parts by weight of PVDF (KF1100 binder) as a binder polymer were added in N-methyl-2-pyrrolidone to obtain a slurry (solid content 65 wt %) for a cathode, and the slurry was coated on an aluminum current collector, to prepare a cathode.

48 Parts by weight of graphite as an anode active material, 1 parts by weight of styrene butadiene rubber (SBR) as a binder polymer, and 0.5 parts by weight of carboxymethyl cellulose (CMC) as a dispersant were added in 50 parts by weight of water to obtain a slurry (solid content 50 wt %) for an anode, and the slurry was coated on a copper current collector, to prepare an anode.

Each of the separators prepared in Examples 1-2 and 2-2 and Comparative Examples 1-2 to 4-2 was interposed between the cathode and the anode obtained above, the non-aqueous electrolyte solution was impregnated to the separator, thereby preparing a cylindrical (18650) secondary battery with a capacity of 3,000 mAh.

Also, the electrical resistance of each separator was evaluated by leaving the coin cells prepared in Examples 1-2 and 2-2 and Comparative Examples 1-2 to 4-2 for 1 day at room temperature and measuring each resistance by way of an impedance measuring method. The results are shown in Table 1.

TABLE 1

|  | Example 1-1 | Example 2-1 | Com. Example 1-1 | Com. Example 2-1 | Com. Example 3-1 | Com. Example 4-1 |
|---|---|---|---|---|---|---|
| Heat-setting Temperature (° C.) | 132.5 | 132.5 | 130 | 132.5 | 130 | 132.5 |
| Separator Thickness (μm) | 20.0 | 14.5 | 20.0 | 20.0 | 14.5 | 14.5 |
| Electrical Resistance (Ω) | 0.7~1.0 | 0.5~0.8 | 0.9~1.2 | >2.0 | 0.7~1.0 | >2.0 |

TABLE 1-continued

|  |  | Example 1-1 | Example 2-1 | Com. Example 1-1 | Com. Example 2-1 | Com. Example 3-1 | Com. Example 4-1 |
|---|---|---|---|---|---|---|---|
| Tensile strength (kg/cm$^2$) | MD | 2,300 | 2,500 | 1,700 | 2,350 | 1,800 | 2,350 |
|  | TD | 2,000 | 2,000 | 1,400 | 2,000 | 1,700 | 2,000 |
| Heat-Shrinkage Rate (%) (150° C./30 min) | MD | <8 | <8 | <12 | <8 | <10 | <7 |
|  | TD | <4 | <4 | <10 | <4 | <10 | <5 |
| Air Permeability | Sec/100 ml | 300 | 170 | 380 | 1,380 | 200 | 1,250 |
| Peeling force | gf/cm | 10,421 | 12,650 | 4,850 | 4,720 | 5,105 | 4,654 |
| Puncture Strength | Kgf | 500 | 520 | 450 | 520 | 450 | 550 |
| Nail Penetration Test | Pass (Number)/Test (Number) | 7/10 | 6/10 | 3/10 | — | 2/10 | — |
| Impact Test | Pass (Number)/Test (Number) | 8/10 | 7/10 | 4/10 | — | 3/10 | — |

MD: Machinel Direction
TD: Transverse Direction

From Table 1, the separator of Example 1-1 and 1-2 exhibited substantially improved tensile strength as compared with those of Comparative Examples 1-1 and 3-1. In terms of air permeability, the separator of Example 1-1 and 2-1 exhibited air permeability similar to or improved over those of Comparative Examples 1-1 and 3-1.

Also, the separator of Example 1-1 and 2-1 exhibited tensile strength similar to those of Comparative Examples 2-1 and 4-1, whereas the separators of Comparative Examples 2-1 and 4-1 had the air permeability of 1,380 sec/100 cc and 1,250 sec/100 cc, respectively, which are not preferable as a separator.

Figure 8:
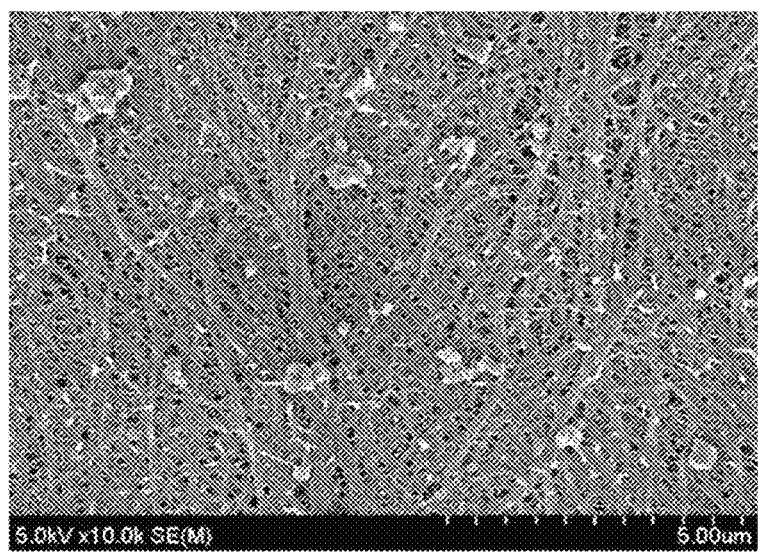
FIG. 8 is an enlarged image for the surface of a porous polymer film in the separator of Comparative Example 1-1.
Figure 9:
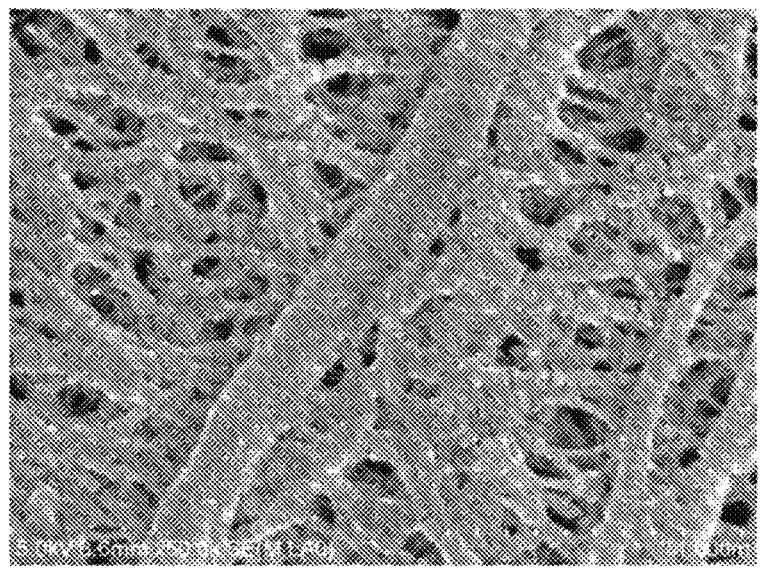
FIG. 9 is an enlarged image for the surface of a porous polymer film in the separator of Comparative Example 2-1.
Figure 10:
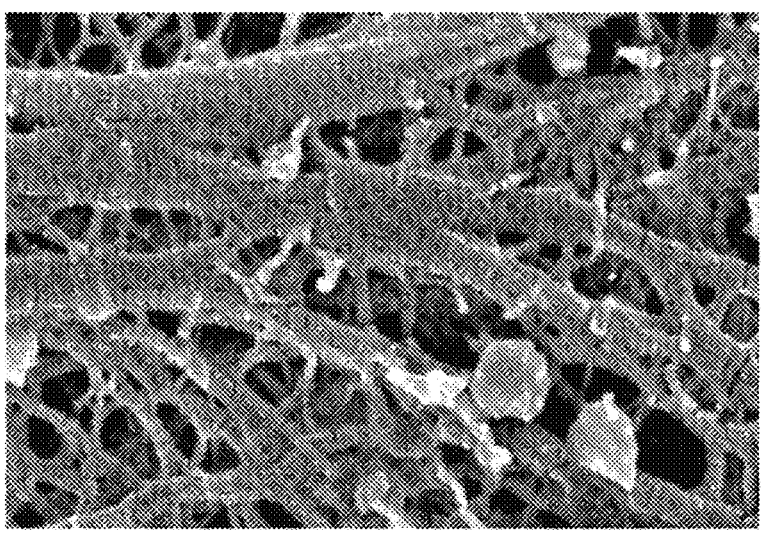
FIG. 10 is an enlarged image for the surface of a porous polymer film in the separator of Example 1-1.

These results can also be confirmed from FIGS. 8 to 10. Specifically, in FIG. 10 showing the porous polymer film according to the present disclosure, fibrils are formed to have high bonding density, without pore closure, as compared with FIGS. 8 and 9.

In addition, the separator of Example 1-1 and 2-1 exhibited high peeling force (about twice or more) than those of Comparative Examples 1-1 and 4-1.

Figure 11:
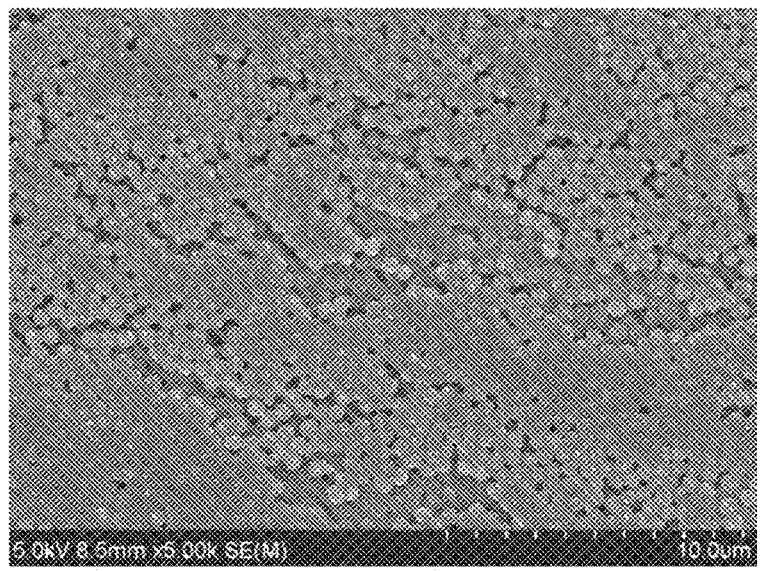
FIG. 11 is an enlarged image for the surface of a porous coating layer in direct contact with a porous polymer film after the separator of Example 1-2 is measured for its peeling force.
Figure 12:
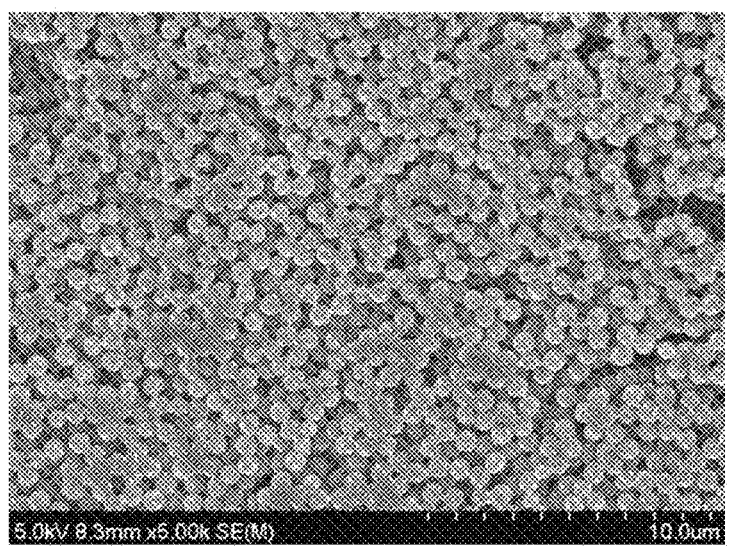
FIG. 12 is an enlarged image for the surface of a porous coating layer in direct contact with a porous polymer film after the separator of Comparative Example 1-3 is measured for its peeling force.

This result can also be confirmed from FIGS. 11 and 12 showing the porous coating layer in contact with the porous polymer film after peeling off. The separator according to one embodiment of the present disclosure was confirmed to have strong structure due to interaction between the fibrils of the porous polymer film and the porous coating layer.

The present invention has been described in detail above. However, it should be understood that the detailed description and specific examples, while indicating preferred embodiments of the present invention, are given by way of illustration only, since various changes and modifications within the spirit and scope of the disclosure will become apparent to those skilled in the art from this detailed description.

What is claimed is:

1. A separator for an electrochemical device, prepared by the steps comprising:
    coating a slurry for a porous coating layer on a first and/or a second surface of a porous polymer film; and
    heat-setting the porous polymer film with the slurry coated thereon,
    wherein the porous coating layer formed on the first and/or the second surface of the porous polymer film comprises at least one of inorganic particles and organic particles, and a binder polymer,
    wherein the second surface is opposite to the first surface,
    wherein fibrils in the first and/or second surface of the porous polymer film having the porous coating layer formed thereon are entangled with the particles in the porous coating layer by 10 to 200 nm in a thickness direction from the first and/or second surface, respectively, of the porous polymer film, and
    wherein the porous coating layer, and the separator has an air permeability of 100 to 800 sec/100 cc, an electrical resistance of 0.5 to 1.5Ω, and a heat-shrinkage rate of 8% or less in each of machine and transverse directions.

2. The separator of claim 1, which has a tensile strength of 1,500 to 2,500 kg/cm$^2$, and a puncture strength of 480 to 1,000 kgf.

3. The separator of claim 1, wherein the porous coating layer has a peeling force to the porous polymer film of no less than 5,000 gf/cm.

4. The separator of claim 1, wherein the porous polymer film is a porous polyolefin film.

5. The separator of claim 4, wherein the porous polyolefin film is selected from polyethylene; polypropylene; polybutylene; polypentene; polyhexene; polyoctene; a copolymer of at least one of ethylene, propylene, butene, pentene, 4-methylpentene, hexene and octene; and a mixture thereof.

6. The separator of claim 1, wherein the porous polymer film has a thickness of 5 to 50 μm, a pore size of 0.01 to 50 and a porosity of 10 to 95%.

7. The separator of claim 1, wherein the binder polymer is any one selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, and a mixture thereof.

8. The separator of claim 1, wherein the porous coating layer comprises the inorganic particles, wherein the inorganic particles are inorganic particles having a dielectric constant of 5 or higher, inorganic particles having the ability to transport lithium ions, or a mixture thereof.

9. The separator of claim 8, wherein the inorganic particles having a dielectric constant of 5 or higher are selected from $BaTiO_3$, $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC and a mixture thereof.

10. The separator of claim 8, wherein the inorganic particles having the ability to transport lithium ions are selected from lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ glass ($Li_xSi_yS_z$, $0<x<3$, $0<y<2$, $0<z<4$), $P_2S_5$ glass ($Li_xP_yS_z$, $0<x<3$, $0<y<3$, $0<z<7$), and a mixture thereof.

11. The separator of claim 1, wherein the porous coating layer comprises the organic particles, wherein the organic particles are selected from polystyrene, polyethylene, polyimide, melamine resins, phenolic resins, cellulose, cellulose modifiers, polypropylene, polyester, polyphenylene sulfide, polyaramid, polyamideimide, polyimide, a copolymer of butyl acrylate and ethyl methacrylate, and a mixture thereof.

12. The separator of claim 1, wherein the inorganic particles and the organic particles have an average diameter of 0.001 to 10 μm.

13. The separator of claim 1, wherein the porous polymer film has the structure that a plurality of fibrils are disposed in parallel with the surface of the film and are laminated in layers, and the fibrils disposed on one surface of the film where the porous coating layer is formed may have a diameter smaller than that of the fibrils disposed in a center of the film in the thickness direction thereof.

14. The separator of claim 1, wherein the fibrils disposed on the first and/or second surface of the film where the porous coating layer is formed have a diameter being 2 to 4 times smaller than that of the fibrils disposed in a center of the film in the thickness direction thereof.

15. The separator of claim 1, wherein the fibrils disposed on the first and/or second surface of the film where the porous coating layer is formed have a diameter of 0.01 to 0.04 μm, and the fibrils disposed in a center of the film in the thickness direction thereof have a diameter of 0.04 to 0.08 μm.

16. The separator of claim 1, wherein the porous polymer film has a porous coating layer formed on only the first or second surface thereof, and fibrils disposed on one surface of the film where the porous coating layer is formed have a diameter smaller than that of fibrils disposed on the first or second surface of the film where the porous coating layer is not formed.

17. The separator of claim 16, wherein the fibrils disposed on the first or second surface of the film where the porous coating layer is formed has a diameter being 2 to 7 times smaller than that of the fibrils disposed on the first or second surface of the film where the porous coating layer is not formed.

18. The separator of claim 16, wherein the fibrils disposed on the first or second surface of the film where the porous coating layer is formed have a diameter of 0.01 to 0.07 μm, and the fibrils disposed on the first or second surface of the film where the porous coating layer is not formed have a diameter of 0.07 to 0.14 μm.

19. The separator of claim 1, wherein the binder polymer is present on a surface of adjacent particles to connect the adjacent particles with each other and form a porous structure, and the binder polymer has a size of 10 to 100 nm.

20. An electrochemical device, comprising a cathode, an anode, and the separator of claim 1 interposed between the cathode and the anode.

21. The electrochemical device according to claim 20, which is a lithium secondary battery.

* * * * *